United States Patent
Cormack et al.

(10) Patent No.: US 8,453,146 B2
(45) Date of Patent: May 28, 2013

(54) APPORTIONING A COUNTED VALUE TO A TASK EXECUTED ON A MULTI-CORE PROCESSOR

(75) Inventors: Christopher J. Cormack, Hillsboro, OR (US); Nathaniel Duca, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 12/645,609

(22) Filed: Dec. 23, 2009

(65) Prior Publication Data

US 2011/0154238 A1    Jun. 23, 2011

(51) Int. Cl.
*G06F 9/455* (2006.01)
(52) U.S. Cl.
USPC .......................................... 718/100; 717/128
(58) Field of Classification Search
None
See application file for complete search history.

(56) References Cited

U.S. PATENT DOCUMENTS

| | | | |
|---|---|---|---|
| 7,725,518 B1 * | 5/2010 | Le Grand | 708/490 |
| 2006/0230409 A1 * | 10/2006 | Frigo et al. | 718/108 |
| 2008/0134185 A1 * | 6/2008 | Fedorova | 718/102 |
| 2009/0100432 A1 * | 4/2009 | Holloway et al. | 718/103 |
| 2009/0217277 A1 * | 8/2009 | Johnson et al. | 718/102 |
| 2011/0099539 A1 * | 4/2011 | Shafi | 717/128 |

* cited by examiner

*Primary Examiner* — Emerson Puente
*Assistant Examiner* — Dong Kim
(74) *Attorney, Agent, or Firm* — Trop, Pruner & Hu, P.C.

(57) ABSTRACT

A technique includes providing data indicative of a counted value acquired by a hardware counter of a processing core during a time segment in which a plurality of tasks are active on the core and, in a processor-based machine, determining a likelihood that the counted value is attributable to a given task of the tasks during the time segment and attributing a portion of the counted value to the given task based at least in part on the determined likelihood.

14 Claims, 6 Drawing Sheets

APPORTIONING A COUNTED VALUE TO A TASK EXECUTED ON A MULTI-CORE PROCESSOR

BACKGROUND

A typical modern computer system may include a multi-core processor, which includes one or more processing cores that execute a large number of threads. A relatively complex software stack may be running on the multi-core processor, and as such, a given software function, such as a draw call, may not be executed serially across the set of processing cores, but instead, the function typically is divided into a multitude of tasks, which are executed across many threads on the processing cores. Additionally, when a specific task executes typically is not deterministic in nature, as any single task may be theoretically preempted by the scheduler, removed from execution mid-stream and rescheduled at a later time on another thread and/or core.

Given these complexities, it may be challenging for an analysis program to determine which monitored performance metrics, such as cache misses, execution stalls, etc., are attributable to a specific task, group of tasks or software function.

DETAILED DESCRIPTION

Figure 1:
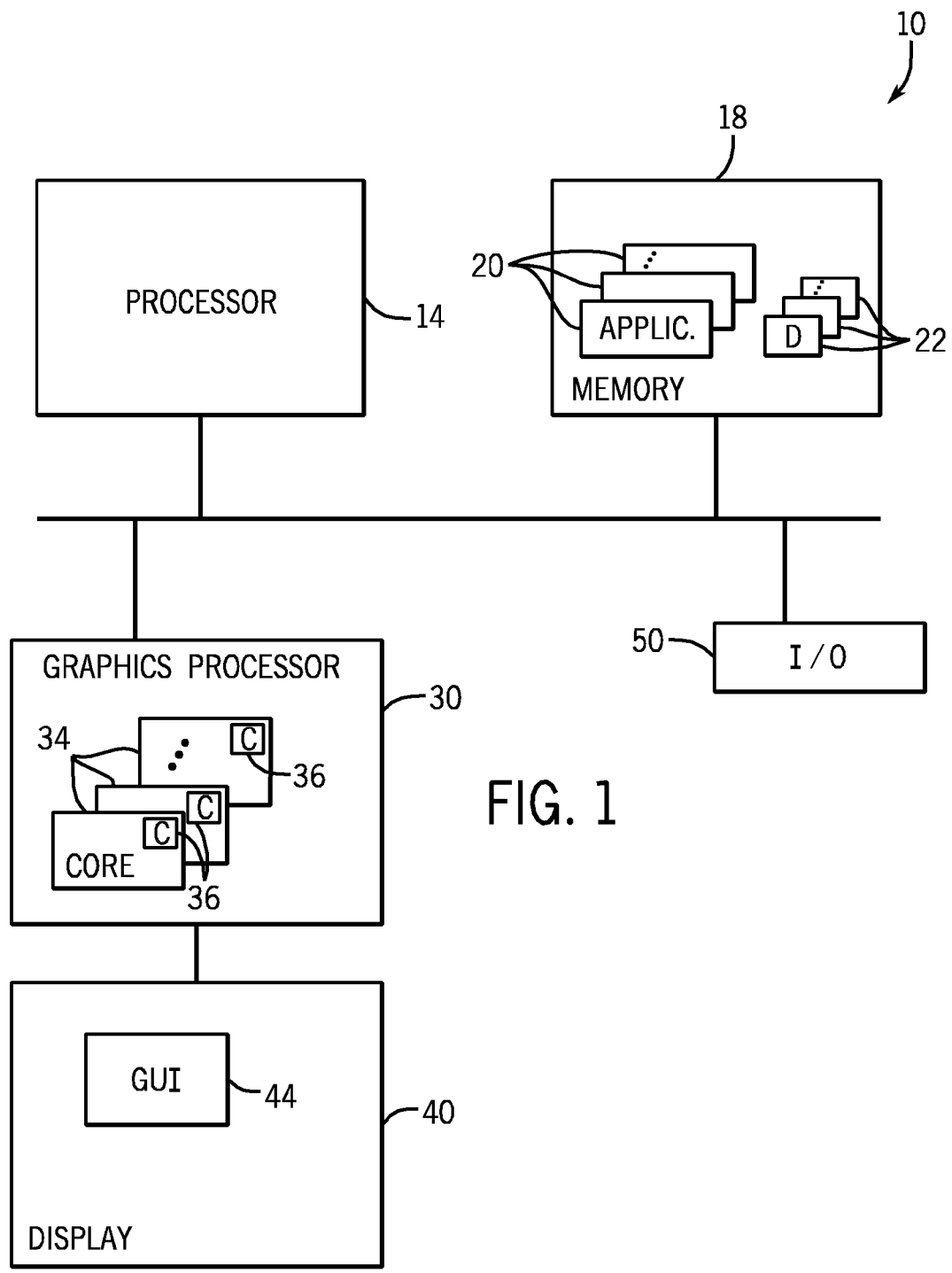
FIG. 1 is a schematic diagram of a computer system according to an embodiment of the invention.

Referring to FIG. 1, in accordance with embodiments of the invention, a multi-core machine, or system 10, has a multi-core graphics processor 30, which has multiple processing cores 34. Each processing core 34, for this example, has a hardware counter 36 (one counter 36 per core 34 being depicted in FIG. 1) to measure a particular performance metric. For example, a given processing core 34 may include a hardware counter 36 to count cache misses, a counter 36 to count the number of execution stalls, a counter 36 to maintain a count indicative of execution utilization, etc. It is noted that the multi-core graphics processor 30 is merely an example of a multi-core processor, as the multi-core processor described herein may be a multi-core processor other than a graphics processor, such as a single instruction multiple data (SIMD) multi-core processor or a main system processor 14 of the system 10, as non-limiting examples.

It is assumed herein that the processing cores 34 execute tasks, where a task is any common unit of work for scheduling and execution. In general, a task can be any portion of code with a beginning and an end and the duration of the task may be defined as a number of processor cycles to execute the task. A given, higher level software function (a draw call in the case of graphics processing, for example) may invoke several tasks are executed across many threads on multiple processing cores 34.

The hardware counter 36 is core specific, such that the processing cores 34 do not have a per thread hardware counter. Instead, the hardware counter 36 is sampled by the individual tasks that are running on the processing core 34 without differentiation. The lack of correspondence between the hardware counter 36 and the tasks may introduce problems in determining what portion of a counted value is attributed to a given task. For example, a particular hardware counter 36 may count cache misses for the entire processing core 34. Although a given task that executes on the processing core 34 may sample the hardware counter 36 at the beginning and end of the task, the counted value (i.e., the count delta) derived from these samples is not necessarily indicative of the cache misses that are attributable to that given task, as many other overlapping tasks may cause cache misses during the time interval is which the given task is active.

In accordance with embodiments of the invention, which are described herein, the system 10 performs a technique to apportion counted values among the tasks that are executing during a given time period. To simplify the following discussion, it is assumed that the hardware counter 36 is a cache miss counter, which is incremented by the processing core 34 each time that a particular cache miss occurs in the core 34. The techniques described herein may be applied to apportion counted values associated with metrics other than cache misses, in accordance with other embodiments of the invention.

Figure 2:
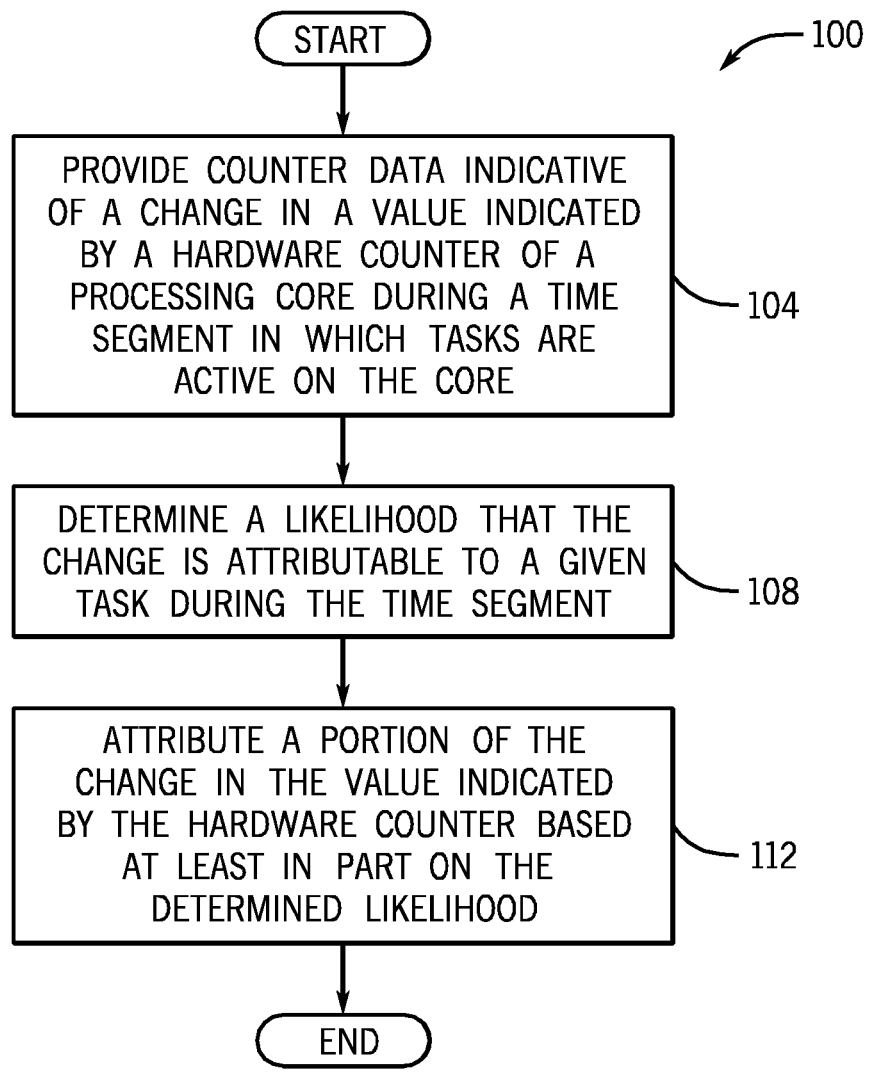
FIG. 2 is a flow diagram depicting a technique to apportion a counted value to a task executed on a multi-core processor according to an embodiment of the invention.

Referring to FIG. 2 in conjunction with FIG. 1, in accordance with some embodiments of the invention, the system 10 performs a technique 100 for purposes of attributing a portion of a counted value to a given task that executes on a processing core 34. The technique 100 includes providing (block 104) counter data indicative of a counted value during a time segment in which multiple tasks are active on the processing core 34. The technique 100 includes determining (block 108) a likelihood that the counted value is attributable to a given task of the tasks during the time segment and attributing a portion of the counted value to the given task based at least in part on the determined likelihood, pursuant to block 112.

Referring to FIG. 1, in accordance with some embodiments of the invention, in general, the graphics processor 30 executes tasks for purposes of generating images on a display 40, such as an exemplary depicted graphical user interface (GUI) 44 that is depicted in FIG. 1. The GUI 44 displays tasks that are executing on the graphics processor 30 and permits a user to select one or more of the tasks for analysis. As a more specific example, in accordance with some embodiments of the invention, the GUI 44 may allow a user to highlight a particular software function (a draw call, as a non-limiting example) for purposes of selecting the function for analysis of performance metrics that are associated with that call. The selected function may be involve a number of tasks that are executed on the graphics processor 30, may involve multiple tasks that are executing on different threads and may involve tasks that are executed on different processing cores 34.

By highlighting and selecting a given software function, a user may benefit from an analysis provided by the system 10, and this analysis may be useful for such purposes of evaluating whether the changes to program code changed certain performance metrics. For example, the performance analysis may reveal that changes to the program increased or reduced the number of cache misses. Other and/or different uses of this analysis are contemplated and are within the scope of the appended claims.

In accordance with some embodiments of the invention, the GUI 44 may be driven by execution of an analysis program that executes on one or more processing cores 34. In other embodiments of the invention, the analysis program may be the result of software that is executing on the main system processor 14 of the system 10. The main processor 14 may include one or more microprocessors and/or microprocessor cores, which execute applications, such as an analysis program. The corresponding program code may be stored in a system memory 18, in accordance with some embodiments of the invention. In this manner, the system memory 18 may store data indicative of one or more applications 20, which are executed by the processor 14. One of the applications 20 may be, for example, an analysis program, which when executed by the processor 14, causes the processor 14 to perform one or more parts of the technique 100 of FIG. 2. In this analysis, the memory 18 may store one or more initial, intermediate or final datasets 22, which may, for example, indicate software function or task selections by the user; sampled counter values, which are sampled by tasks executing on the graphics processor 30; counted values attributable to specific tasks; errors associated with the determined counted values for the tasks; etc.

Among the other features of the system 10, the system 10 may include an input/output (I/O) interface 50 for purposes of receiving I/O data from such input devices as a mouse or a keyboard, which may be to select tasks for analysis. The system 10 may include a network interface card (NIC) for purposes of communicating with a network.

It is noted that the architecture that is depicted in FIG. 1 is merely an example of a multi-core system that may be used to implement the counted value apportionment techniques that are disclosed herein. For example, in other embodiments of the invention, counted values derived via processing on the main processor 14 may be apportioned to tasks that are active on the processor 14. Furthermore, the system 10 may have numerous other components that are not depicted in FIG. 1, such as additional graphics processors, bridges, peripheral devices and other components, in accordance with other embodiments of the invention.

Figure 3:
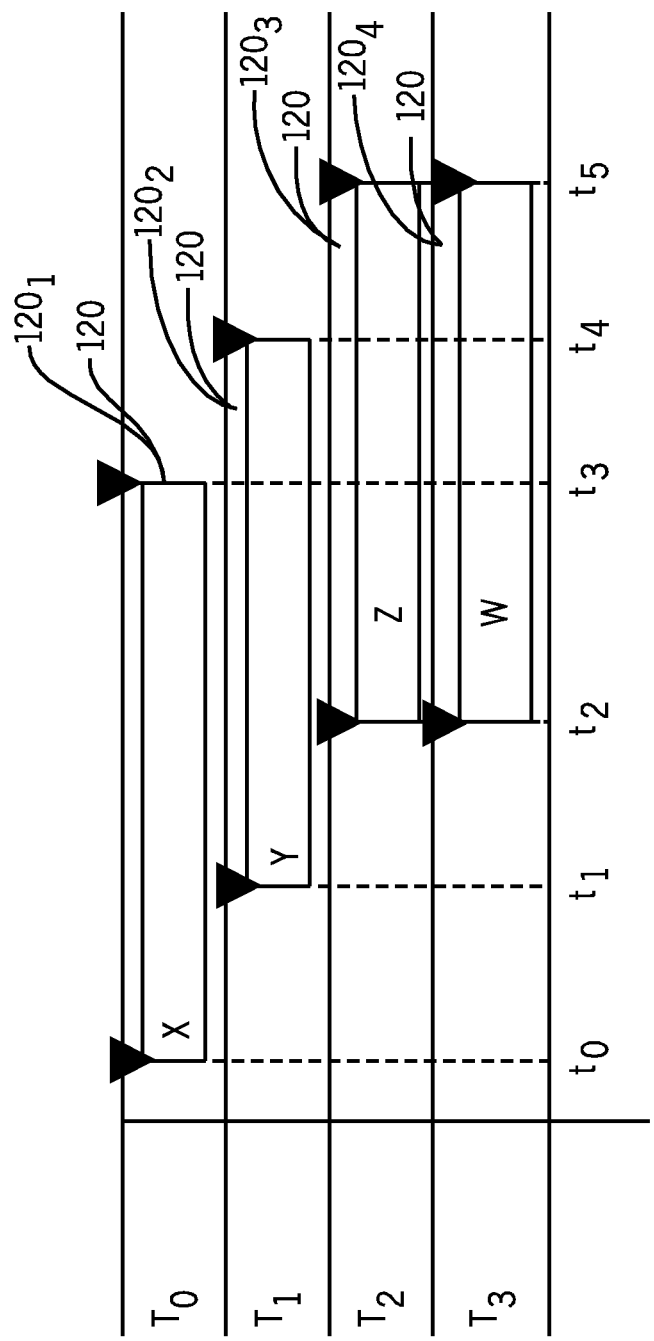
FIG. 3 is an illustration of time-overlapping tasks that are executed on a multi-core processor according to an embodiment of the invention.

FIG. 3 depicts an example to illustrate how the system 10 (FIG. 1) apportions a counted value to a particular task, in accordance with some embodiments of the invention. Referring to FIG. 3 in conjunction with FIG. 1, it is assumed for this example that multiple tasks 120 (specifically tasks $120_1$, $120_2$, $120_3$ and $120_4$, as examples) are active in overlapping time intervals. The goal for this example is to determine a counter change value attributable to the execution of the task $120_4$. As can be seen from FIG. 3, tasks $120_1$, $120_2$ and $120_3$ execute on threads $T_0$, $T_1$ and $T_2$, respectively and overlap at least partially with the task $120_4$, which executes on thread $T_4$. The time of particular interest for this example is time $t_2$ to time $t_5$ during which the task $120_4$ is active. Although the task $120_4$ samples beginning and ending counter values at times $t_2$ and $t_5$, respectively, to derive a counted value, this counted value does not directly indicate a counted value that is attributable solely to the task $120_4$.

For purposes of attributing the change in the counted value to the task $120_4$, the system 10 divides the time interval from time $t_2$ to time $t_5$ into "time slices." In this context, a "time slice" is a unit of time in which the number of active tasks 120 does not change. Using this criteria, the example depicted in FIG. 3 therefore depicts three relevant time slices for purposes of apportioning the counted value to the task $120_4$: a first time slice from $t_2$ to time $t_3$ in which all four tasks $120_1$, $120_2$, $120_3$ and $120_4$ are active; a second time slice from time $t_3$ to time $t_4$ in which the slices $120_2$, $120_3$ and $120_4$ are active; and a third time slice from time $t_4$ to time $t_5$ in which the tasks $120_3$ and $120_4$ are active.

In accordance with some embodiments of the invention, ideally, each task 120 samples the hardware counter 34 at the beginning and end of the task 120. Therefore, for the four tasks $120_1$, $120_2$, $120_3$ and $120_4$, which are depicted in FIG. 3, the hardware counter 34 is sampled eight corresponding times. As non-limiting example, data indicative of the sampled counter values may stored on the graphic processor 30 and/or may be communicated to the memory 18, where the stored value is stored as a dataset 22, for example, in accordance with some embodiments of the invention.

Each time slice is associated with a particular counted value. For example, the time slice from $t_2$ to time $t_3$ is associated with a counted value that is derived from the sampled counter value taken at time $t_3$ less the sampled counter value indicated at time $t_2$. For each time slice, the system 10 apportions the associated counted value to the task $120_4$ in accordance with a determined likelihood that the task $120_4$ changed the counter value during that time slice. Thus, for the time slice from time $t_0$ to time $t_1$, the portion of the counted value attributable to the task $120_4$ is zero; and likewise, for the time slice from time $t_1$ to time $t_2$, the portion of the counted value attributable to the task $120_4$ is zero, as the task $120_4$ is not active during these time slices. However, for the remaining time slices depicted in FIG. 3, the task $120_4$ is active, and thus, the system 10 attributes a portion of the counted value to the task $120_4$.

After the system 10 determines the apportioned counted value for each time slice of the task $120_4$, the system 10 performs a summation of the apportioned counted values to derive an apportioned counted value for the task $120_4$ from the beginning of the task at time $t_2$ to the end of the task at time $t_5$.

As a more specific example, for the time slice from time $t_2$ to time $t_3$, the task $120_4$ is concurrently active with the tasks $120_1$, $120_2$ and $120_3$. As a non-limiting example, the system 10 assesses the likelihood for the task $120_4$, as one fourth of the counted value during this time slice, as four time slices were active. Thus, for example, if the counter changes by 100 counts during the time slice from time $t_2$ to time $t_3$, one fourth, or a counter change of 25, is attributed to the task $120_4$ for this time slice. During the time slice from time $t_3$ to time $t_4$, the task $120_4$ is active with two other time slices $120_2$ and $120_3$; and as a result, one third of the associated counted value is attributed to the task $120_4$ during this time slice. Likewise, during the time slice from time $t_4$ to time $t_5$, the task $120_4$ is active with the task $120_3$; and as a result, the system 10 attributes one half of the counted value to the task $120_4$ during this time slice.

The above-described proportional apportionment of the counted value based on the number of tasks that are active is an example of one of many different possible ways to apportion the counted value. For example, in accordance with other embodiments of the invention, the counted value apportionment may be based on a weighting scheme. For example, tasks 120 that are more computationally intensive may be assigned greater weights and thus, may be assigned a disproportionately greater amount of the counted value, as compared to tasks that are less computationally intensive. Thus, many variations are contemplated and are within the scope of the appended claims.

Figure 4:
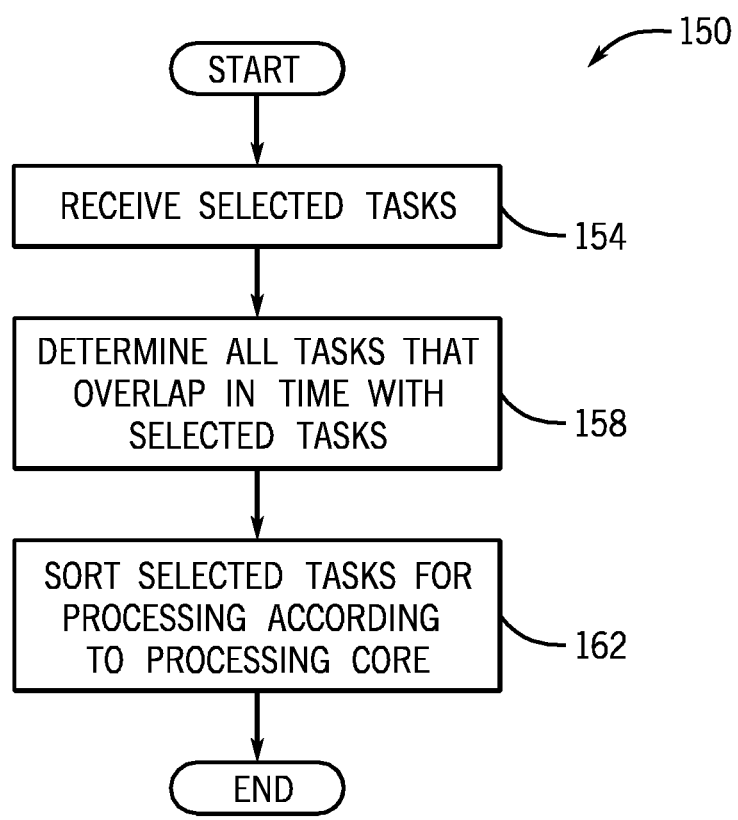
FIG. 4 is a flow diagram depicting a technique to sort selected tasks according to the processing core on which the tasks execute according to an embodiment of the invention.

Referring to FIG. 4 in conjunction with FIG. 1, in accordance with some embodiments of the invention, the system 10 performs a technique 150 for purposes of identifying tasks to be analyzed on the specific processing cores 34. Pursuant to the technique 150, the system 10 receives a user input indicative of selected tasks, pursuant to block 154. Thus, as an example, a user may, via the GUI 44, highlight and select a particular call (a draw call, as a non-limiting example) using a mouse, for example. In response to the selected tasks, the system 10 determines (block 158) all tasks that overlap in time with the selected tasks, pursuant to block 158. After this identification, the system 10 sorts (block 162) the analyzed tasks according to processor core 34, pursuant to block 162.

Figure 5A:
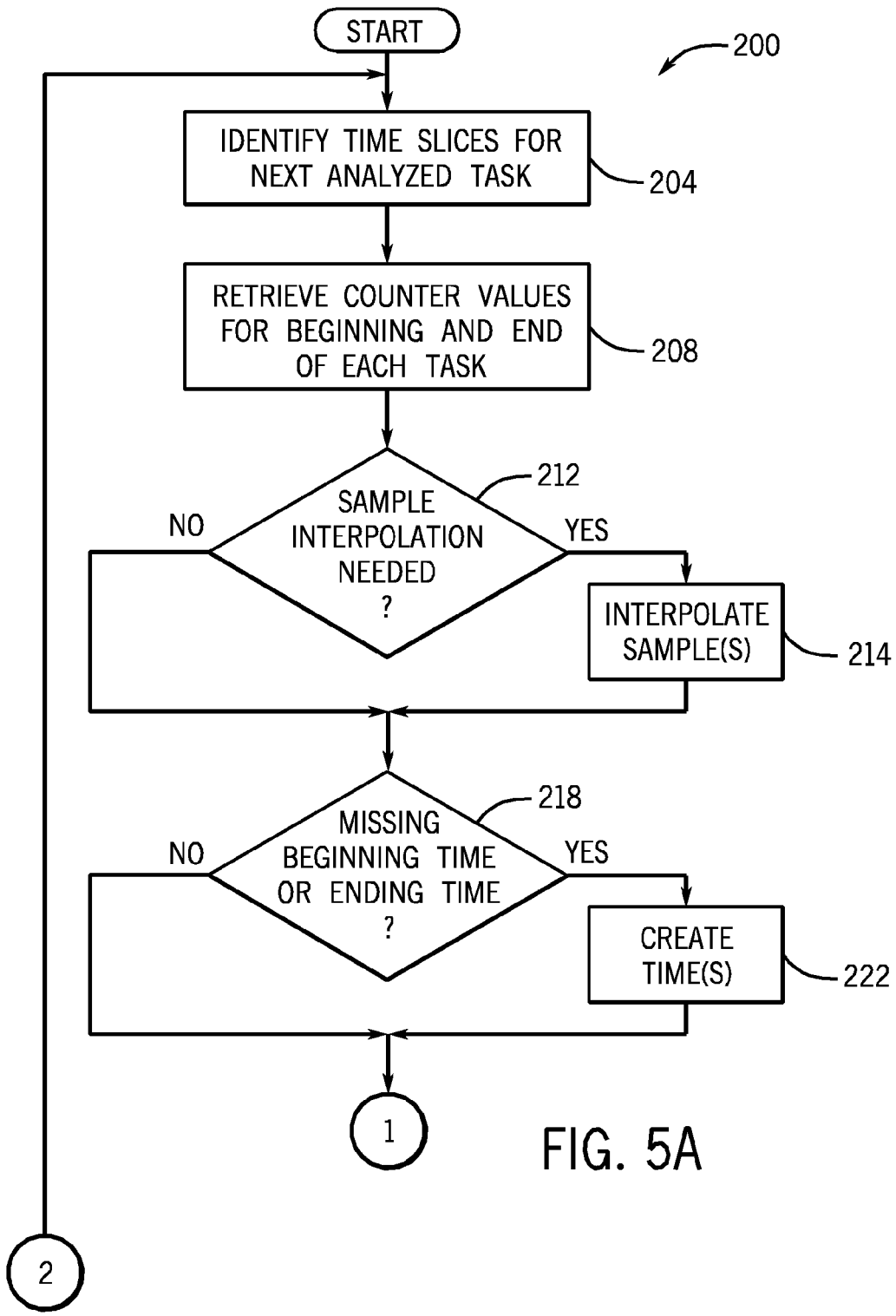
FIGS. 5A and 5B are flow diagrams depicting a technique to apportion a counted value to selected tasks executing on a processing core according to an embodiment of the invention.
Figure 5B:
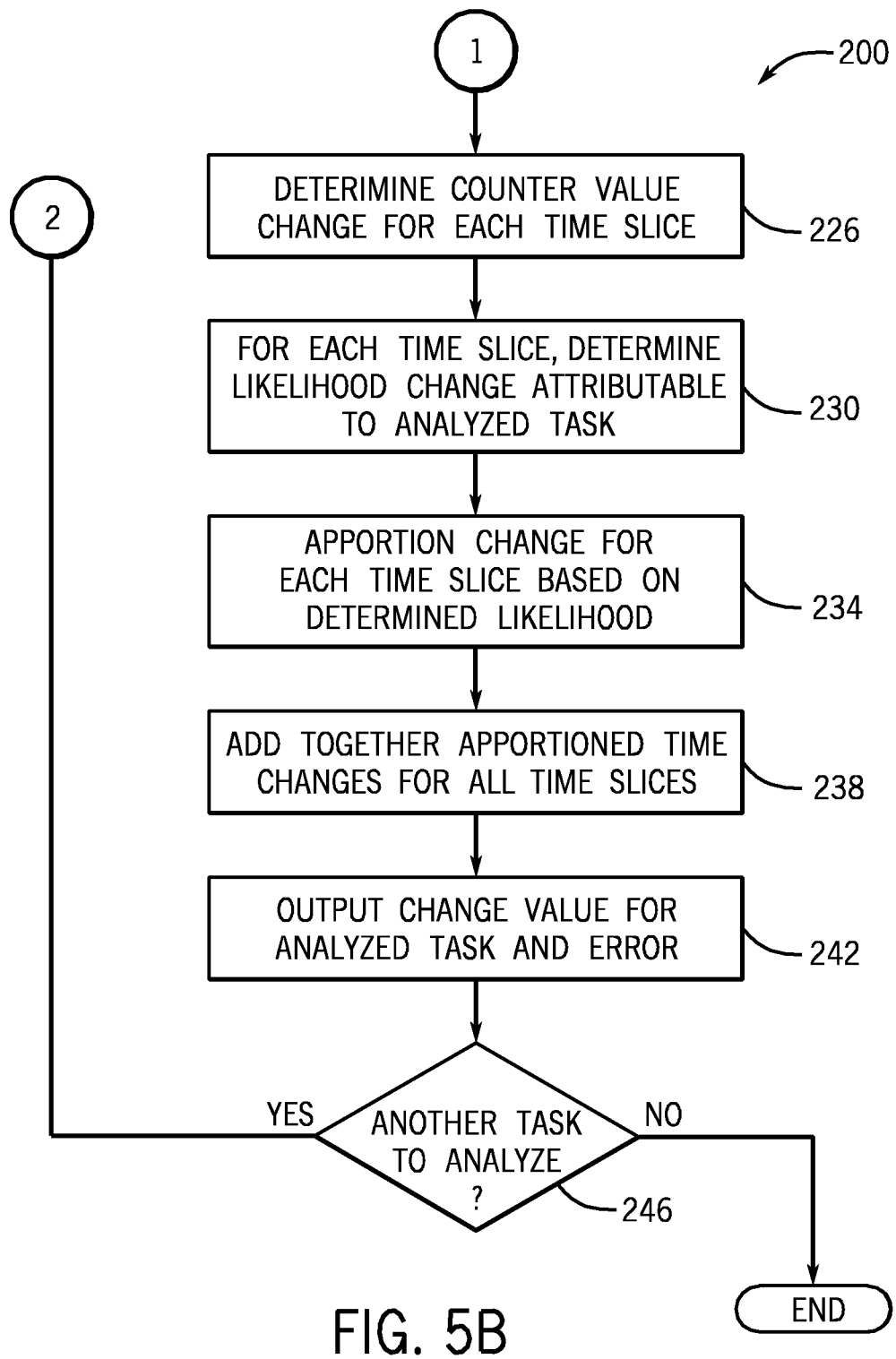

Referring to FIGS. 5A and 5B in conjunction with FIG. 1, after the system 10 determines the tasks to be analyzed on each processing core 34, the system 10, in accordance with some embodiments of the invention, performs a technique 200 for each processing core 34.

Pursuant to the technique 200, the system 10 processes each selected task on each processing core 34 as follows. First, the system 10 identifies (block 204) time slices for the next available task and retrieves (block 208) sampled counter values for the beginning and end times of each task. The system 10 may interpolate the beginning and/or ending time, if a sample is not available. In this manner, the system 10 determines (diamond 212) whether interpolation of a sample is needed and if so, performs the interpolation pursuant to block 214.

In accordance with some embodiments of the invention, the system 10 performs the sample interpolation as follows. The system 10 finds the closest sampled counter value on either side of the time at which a sample is to be interpolated. Based on the location of this time between the two times at which samples are available, the system 10 adjusts the difference in the sampled values to derive the interpolated value. This may be a linear interpolation, in accordance with some embodiments of the invention. As a non-limiting example, sample values may be available for processor cycle counts 100 and 200, and these values may have values of 300 and 360, respectively. The time at which the sample is to be interpolated may be processor cycle count 120. Therefore, for this scenario, the interpolated sample would be 312.

Still referring to FIGS. 1, 5A and 5B, after possible interpolation of one or more sample values, control proceeds to diamond 218, in which the system 10 determines whether a particular task is missing a beginning or ending time stamp. If so, then the system 10, pursuant to block 222, creates a corresponding time stamp by finding the closest beginning or ending time of another task.

After the data has been preconditioned as set forth above, the system 10, pursuant to the technique 200 proceeds to apportion the counted value for each time slice of the analyzed task according the time slices of the task. In this manner, pursuant to block 226, the system 10 determines a counted value for each time slice and determines (block 230), for each time slice, the likelihood that the counted value is due to the task. Next, the system 10 apportions (block 234) the counted value for each time slice based on the determined likelihood and subsequently adds together the apportioned counted values for all time slices of the analyzed task, pursuant to block 238, to derive a apportioned counted value for the entire task.

Finally, the system 10, pursuant to the technique 200, outputs (block 242) the apportioned counted value for the task and a value indicative of the error in the determined counted value. As a non-limiting example, the error may be computed with each time slice along with the apportioned value. For example, if for a particular time slice, the apportioned counted value is thirty three percent of the overall time change for the time slice due to two other tasks concurrently being active in the time slice, then the reported error would be the percentage of the remaining apportioned counted value, or sixty seven percent. It is noted that the error decreases with corresponding increases in the number of concurrently active tasks. Thus, for a fairly large number of active tasks, such as several thousand tasks, the error is relatively small.

Finally, pursuant to the technique 200, the system 10 determines whether another task is to be analyzed for the processing core, pursuant to diamond 246. If so, control returns to block 154 (FIG. 5A).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   providing data indicative of a counted value acquired by a hardware counter of a processing core during a time segment in which a plurality of tasks are active on the core; and
   in a processor-based machine, determining a likelihood that the counted value is attributable to a given task of the tasks during the time segment and attributing a portion of the counted value to the given task based at least in part on the determined likelihood,
   wherein determining the likelihood that the counted value is attributable to the given task comprises:
      dividing the time segment into time slices such that all of the tasks active at the beginning of each time slice were active at least until the end of the time slice;
      for each time slice, determining a likelihood that the counted value is attributable to the given task during the time slice; and
      determining samples of the counter for time boundaries of the time slices, comprising selectively interpolating at least one of the samples based at least in part on data indicative of a counter sample at another time.

2. The method of claim 1, wherein selectively interpolating the samples comprises interpolating a beginning time for one of the time slices.

3. The method of claim 1, wherein selectively interpolating the samples comprises interpolating an end time for one of the time slices.

4. The method of claim 1, further comprising:
   providing a user interface on the machine to select the given task; and
   displaying the attributed portion on the user interface.

5. The method of claim 4, wherein the act of providing the user interface comprises providing the user interface to select a group of tasks which include the given task, the method further comprising:
   identifying that the given task was active on the processing core.

6. A system comprising:
   a hardware counter of a processing core, the counter to indicate a counted value during the time segment in which a plurality of tasks are active on the core; and
   a processor to determine a likelihood that the counted value is attributable to a given task of the tasks during the time segment and attribute a portion of the counted value to the given task based at least in part on the determined likelihood,
   wherein determining the likelihood that the counted value is attributable to the given task comprises:
      dividing the time segment into time slices such that all of the tasks active at the beginning of each time slice were active at least until the end of the time slice;

for each time slice, determining a likelihood that the counted value is attributable to the given task during the time slice; and determining samples of the counter for time boundaries of the time slices, comprising selectively interpolating at least one of the samples based at least in part on data indicative of a counter sample at another time.

7. The system of claim 6, wherein selectively interpolating the samples comprises interpolating a beginning time for one of the time slices.

8. The system of claim 6, wherein selectively interpolating the samples comprises interpolating an end time for one of the time slices.

9. The system of claim 6, wherein the processor provides a user interface on the machine to select the given task and displays the attributed portion on the user interface.

10. The system of claim 6, wherein the processor provides the user interface to select a group of tasks which include the given task and identifies that the given task was active on the processing core.

11. An article comprising a non-transitory computer readable storage medium to store instructions that when executed cause a computer to:

provide data indicative of a counted value indicated by a hardware counter of a processing core during a time segment in which tasks are active on the core; and determine a likelihood that the counted value is attributable to a given task of the tasks during the time segment and attribute a portion of the counted value to the given task based at least in part on the determined likelihood, wherein determining the likelihood that the counted value is attributable to the given task comprises:

dividing the time segment into time slices such that all of the tasks active at the beginning of each time slice were active at least until the end of the time slice;

for each time slice, determining a likelihood that the counted value is attributable to the given task during the time slice; and determining samples of the counter for time boundaries of the time slices, comprising selectively interpolating at least one of the samples based at least in part on data indicative of a counter sample at another time.

12. The article of claim 11, the storage medium storing instructions that when executed by the computer cause the computer to provide a user interface on the machine to select the given task and display the attributed portion of the counted value on the user interface.

13. The article of claim 11, wherein the computer comprises a graphics processor to execute the instructions.

14. The article of claim 11, wherein the computer comprises a main processor to execute instructions and a graphics processor comprising the processing core.

* * * * *